United States Patent
Sawata et al.

(10) Patent No.: US 12,278,533 B2
(45) Date of Patent: Apr. 15, 2025

(54) WINDINGS FOR ELECTRICAL MACHINES

(71) Applicant: Hamilton Sundstrand Corporation, Charlotte, NC (US)

(72) Inventors: Tadashi Sawata, Coventry (GB); Edward Graham Charles Pocock, Birmingham (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 260 days.

(21) Appl. No.: 17/941,536

(22) Filed: Sep. 9, 2022

(65) Prior Publication Data
US 2023/0112188 A1 Apr. 13, 2023

(30) Foreign Application Priority Data
Oct. 4, 2021 (EP) .................................. 21275144

(51) Int. Cl.
*H02K 3/24* (2006.01)
*B64D 27/10* (2006.01)
*B64D 27/24* (2006.01)
*B64D 35/00* (2006.01)
*F02C 6/00* (2006.01)
*B64D 27/02* (2006.01)

(52) U.S. Cl.
CPC .............. *H02K 3/24* (2013.01); *B64D 27/10* (2013.01); *B64D 27/24* (2013.01); *B64D 35/00* (2013.01); *F02C 6/00* (2013.01); *B64D 27/026* (2024.01)

(58) Field of Classification Search
CPC ... F02C 7/32; H02K 3/12; H02K 3/14; H02K 3/24
See application file for complete search history.

(56) References Cited

U.S. PATENT DOCUMENTS

| | | | |
|---|---|---|---|
| 2,727,161 A | 12/1955 | Kilner et al. | |
| 6,806,594 B2 * | 10/2004 | Koyanagawa | H02K 41/03 310/15 |
| 7,034,428 B2 | 4/2006 | Cai et al. | |
| 7,705,508 B2 | 4/2010 | Dooley et al. | |
| 8,115,348 B2 * | 2/2012 | Hsu | H02K 41/03 310/12.22 |
| 9,337,693 B2 | 5/2016 | Takahashi | |
| 9,479,020 B2 | 10/2016 | Hisada | |
| 10,450,886 B2 * | 10/2019 | Sennoun | F02K 5/00 |

(Continued)

FOREIGN PATENT DOCUMENTS

| | | |
|---|---|---|
| CH | 375431 A | 2/1964 |
| FR | 1071766 A | 9/1954 |
| WO | WO-0010750 A1 | 3/2000 |

OTHER PUBLICATIONS

Extended European Search Report for European Patent Application No. EP21275144.0, dated Mar. 23, 2022.

(Continued)

*Primary Examiner* — Thuyhang N Nguyen

(57) ABSTRACT

The present disclosure relates to a winding for an electrical machine. The winding comprises at least one flat conductor having at least one turn to form the winding, and the at least one flat conductor comprises a substantially L-shaped, U-shaped or V-shaped cross-section. The present disclosure also relates to an electrical machine that includes the winding and an aircraft that includes the electrical machine.

20 Claims, 3 Drawing Sheets

(56) References Cited

U.S. PATENT DOCUMENTS

| | | | |
|---|---|---|---|
| 10,742,098 B2 | 8/2020 | Tangudu et al. | |
| 10,892,660 B2* | 1/2021 | Juris et al. | |
| 10,992,202 B2* | 4/2021 | Lee | H02K 3/04 |
| 11,085,371 B2* | 8/2021 | Kupratis | F01D 17/16 |
| 2019/0273409 A1* | 9/2019 | Lee | H02K 3/04 |
| 2021/0126496 A1 | 4/2021 | Saint-Michel | |
| 2022/0077738 A1 | 3/2022 | Takahashi | |

OTHER PUBLICATIONS

Wu Fan et al: "Investigation of an Additively-Manufactured Modular Permanent Magnet Machine for High Specific Power Design", 2019 IEEE Energy Conversion Congress and Exposition (ECCE), IEEE, Sep. 29, 2019 (Sep. 29, 2019), pp. 777-784, XP033666598, DOI: 10.1109/ECCE.2019.8912763 [retrieved on Nov. 25, 2019].
Sayed Ehab et al: "Review of Electric Machines in More-/Hybrid-/Turbo-Electric Aircraft", IEEE Transactions on Transportation Electrification, IEEE, vol. 7, No. 4, Jun. 15, 2021 (Jun. 15, 2021), pp. 2976-3005, XP011880912, DOI: 10.1109/TTE.2021.3089605 [retrieved on Sep. 29, 2021].
Communication under Rule 71(3) EPC dated Nov. 22, 2024 in connection with European Patent Application No. 21275144.0, 26 pages.

\* cited by examiner

WINDINGS FOR ELECTRICAL MACHINES

CROSS-REFERENCE TO RELATED APPLICATIONS

This application claims priority to and the benefit of European Patent Application No. 21275144.0, filed Oct. 4, 2021, the entire content of which is incorporated herein by reference.

TECHNICAL FIELD

The present disclosure relates to windings for electrical machines. The present disclosure also relates to an electrical machine including the windings and an aircraft including the electrical machine.

BACKGROUND

An electrical machine utilises electromagnetic forces to convert electrical energy to mechanical energy (referred to as an electric motor) or to convert mechanical energy to electrical energy (referred to as an electric generator). Electrical machines typically comprise a stationary stator, a rotor configured to rotate relative to the stator, and one or more windings formed by a coil of conductive material, for example copper, wrapped around portions of the stator. During operation of the electrical machine as a motor, electric current is passed through the winding, which generates a magnetic field. A second magnetic field is generated by the rotor, either by permanent magnets or electromagnets/coils mounted thereon. The interaction between these two magnetic fields induces a torque on the rotor, thus causing the rotor to rotate relative to the stator. This operation may also be conducted in reverse, in that the rotor may be mechanically rotated to induce an electrical current in the winding. Depending on the type of electrical machine, the winding may be mounted to the rotor instead of the stator.

One use for electrical machines is to provide some or all of the energy required for the propulsion of a vehicle. In such electrical machines, the windings are typically mounted in slots in the stator, and are used to generate a magnetic field that interacts with magnetic fields associated with the rotor to produce torque on the rotor.

Power requirements for high performance electrical propulsion motors can exceed 1 MW. Therefore, important factors for the design of such high performance electric propulsion motors are power density and specific power. A higher power density and/or specific power means that for a given power requirement, the motor can be smaller and lighter, which is particularly advantageous for electric propulsion motors in vehicles such as aircraft, where space and weight are key limiting factors. In order to help realise a higher power density or specific power, the windings of the electrical machine need to be able to carry as much power as possible. Unfortunately, AC losses and conductor overheating can restrict the power carrying capacity of the windings.

AC losses may be caused by the skin effect, which is the tendency of a high-frequency alternating current to flow through only the outer layer of a conductor, caused by opposing eddy currents induced by the changing magnetic field resulting from the alternating current. The skin effect effectively limits the cross-sectional area of the conductor that can be utilized to carry current, and also increases with frequency. The reduction in current carrying cross-section can also contribute to conductor overheating. It is therefore desirable to employ conductor configurations that minimise such eddy current generation to improve the current carrying capacity and operating temperature for a given cross-section of conductor.

It is also desirable to efficiently cool the conductors to prevent overheating to allow the conductor to carry a higher power. This can be done by providing configurations of conductors that permit liquid cooling thereof e.g., with oil or a similar cooling fluid, to keep the operating temperature of the conductors within a safe range.

Although prior arrangements exist and may be adequate for certain applications, improvements thereto are nevertheless desirable. Accordingly, the present disclosure aims to provide a winding with a conductor configuration that minimizes AC losses and allows effective cooling thereof to maximise power carrying capacity. Such a winding can improve the power density and/or specific power of an electrical machine. This may be particularly suited for electric propulsion motors used in aircraft applications, where there is a high power requirement, but weight and size are to be minimised where possible.

SUMMARY

From one aspect, the present disclosure provides a winding for an electrical machine. The winding comprises at least one flat conductor having at least one turn to form the winding, wherein the at least one flat conductor comprises a substantially L-shaped, U-shaped or V-shaped cross-section.

It is to be understood that the cross-section is that taken in the longitudinal direction of the conductor i.e., along its axial length.

In an embodiment of the above, the at least one flat conductor comprises one or more pairs of conductors. The conductors in each pair of conductors are disposed opposite each other and form a cooling channel there between. There is no contact between the conductors.

In another embodiment of either of the above, the conductors of each pair of conductors are interleaved with each other.

In yet another embodiment of any of the above, each conductor comprises an L-shaped cross-section defining a long side and a short side joined by a substantially 90 degree angle. In a further embodiment, the long side is approximately three times the length of the short side.

In a further embodiment of the above, the L-shaped conductors in each pair of conductors are disposed opposite each other to form a substantially rectangular cooling channel there between.

In an alternative embodiment to the above, each conductor comprises a U-shaped cross-section defining a base and two sides each joined to a respective end of the base by a substantially 90 degree angle. In a further embodiment, one or both of the sides is approximately three times the length of the base. In yet a further embodiment, one of the sides is shorter than the other side.

In a further embodiment of the above, the U-shaped conductors in each pair of conductors are interleaved such that a cooling channel is formed between one of the sides of one of the pair of conductors and the base of the other of the pair of conductors.

In yet a further embodiment, the U-shaped conductors in each pair of conductors are interleaved such that a substantially S-shaped gap separates the pair of conductors.

From another aspect, the present disclosure provides an electrical machine comprising a stator. The stator comprises a slot and the winding of the above aspect or any of its embodiments, disposed within the slot.

From yet another aspect, the present disclosure provides an aircraft comprising the electrical machine of the above aspect.

In one embodiment, the aircraft further comprises a propeller, and the electrical machine is configured to drive the propeller.

In another embodiment, the aircraft further comprises a gas turbine engine, and the electrical machine is configured to supplement drive for the gas turbine engine. Although certain advantages may be discussed in relation to certain features above, other advantages of certain features may become apparent to the skilled person following the present disclosure.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
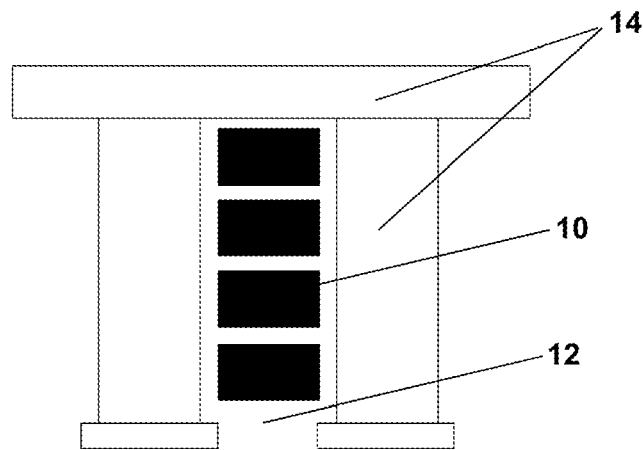
FIG. 1 shows a cross-sectional view of a prior art stator winding comprising a rectangular conductor.

FIG. 1 shows one prior art arrangement. A winding comprises a conductor 10 having at least one turn forming the winding. The winding is mounted within a slot 12 in a stator 14. The conductor 10 has a rectangular cross-section. Rectangular conductors are commonly used in high power applications, such as those discussed above, because they can carry a large current and are suitable for liquid cooling. However, AC losses can be particularly high in rectangular conductors due to the skin effect, which may also result in overheating.

Figure 2:
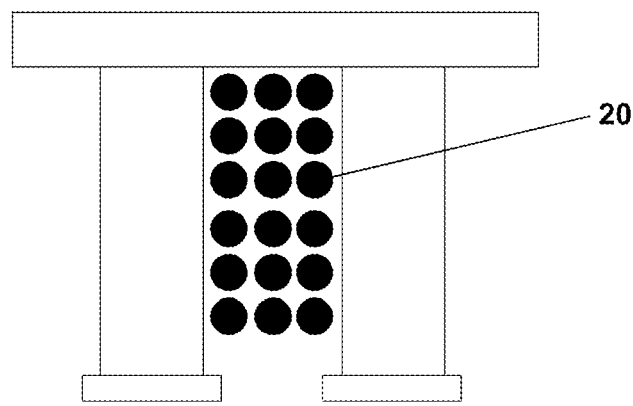
FIG. 2 shows a cross-sectional view of a prior art stator winding comprising a multi-strand conductor.

With reference to the prior art arrangement shown in FIG. 2, one known way of reducing AC losses caused by the skin effect is to form the conductor from multiple strands 20 having a smaller cross-section. However, one drawback of this configuration is that it reduces the ratio of the cross-sectional area of conductive material within the stator slot relative to the total cross-sectional area available within the slot. This is known as the slot fill factor. A lower slot fill factor reduces the current that can be passed through the winding, thus reducing power density and specific power. In this arrangement, cooling is also compromised, further reducing power density and specific power.

Figure 3:
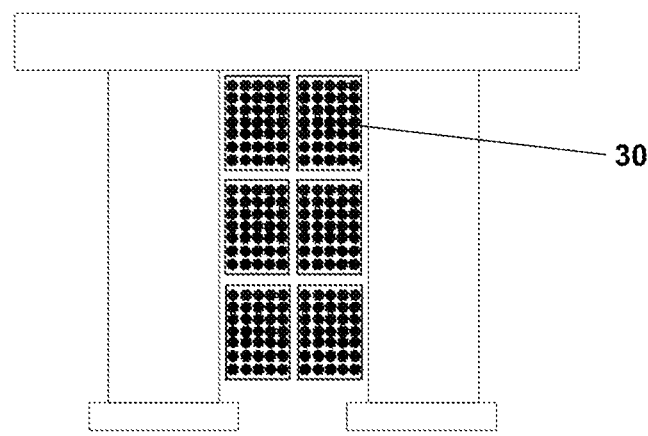
FIG. 3 shows a cross-sectional view of a prior art stator winding comprising a Litz wire conductor.

With reference to the prior art arrangement shown in FIG. 3, one particularly effective way of reducing AC losses caused by the skin effect is to form the conductor from Litz wire 30, which is specifically designed to reduce losses caused by the skin effect. However, this configuration can compromise the slot fill factor and cooling even further relative to the previous multi-strand conductor 20.

Figure 4:
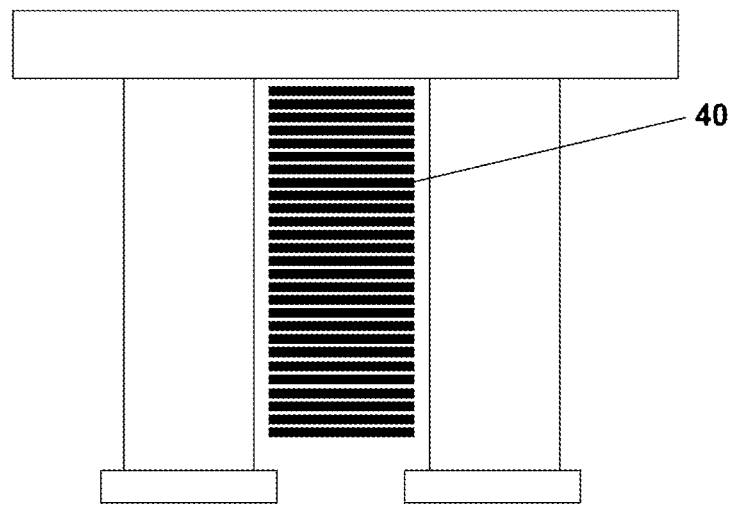
FIG. 4 shows a cross-sectional view of a prior art stator winding comprising a flat wire conductor.

With reference to the prior art arrangement shown in FIG. 4, a known way of maintaining a high slot fill factor while reducing losses caused by the skin effect is to form the conductor from a plurality of flat wires 40. The flat wires 40 are stacked within the slot to increase the slot fill factor. However, the flat wires 40 may not be suitable for applications which require liquid cooling, as making a channel for a cooling medium to flow may be difficult. Such an arrangement may also result in uneven temperature distribution, with much higher temperatures in the centre of the stack of flat wires 40, again reducing power density and specific power.

Figure 5:
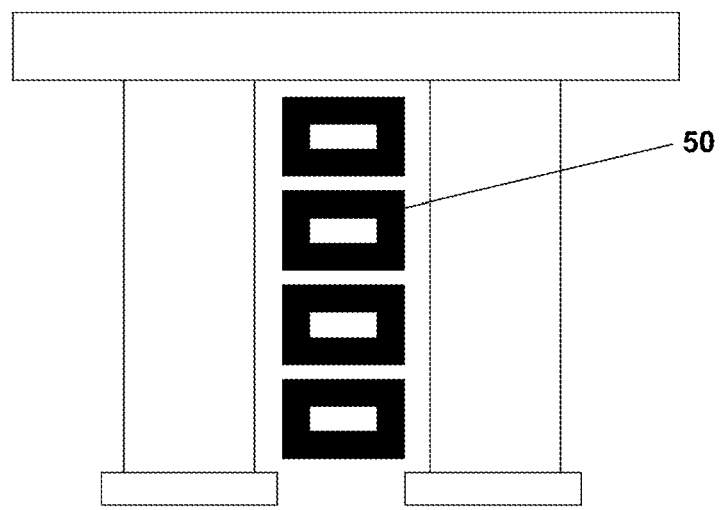
FIG. 5 shows a cross-sectional view of a prior art stator winding comprising a hollow conductor.

With reference to the prior art arrangement shown in FIG. 5, very large electrical machines which require significant cooling, such as power station generators, commonly utilise hollow conductors 50. Hollow conductors 50 provide a central channel within the conductor 50 for flowing a cooling medium. This enhances cooling of the conductors 50, which is particularly important in these very large electrical machines. However, again, the slot fill factor is significantly reduced, thus reducing power density and specific power. Moreover, although skin effect generation may be reduced in such configurations, it is still not minimised.

Figure 6:
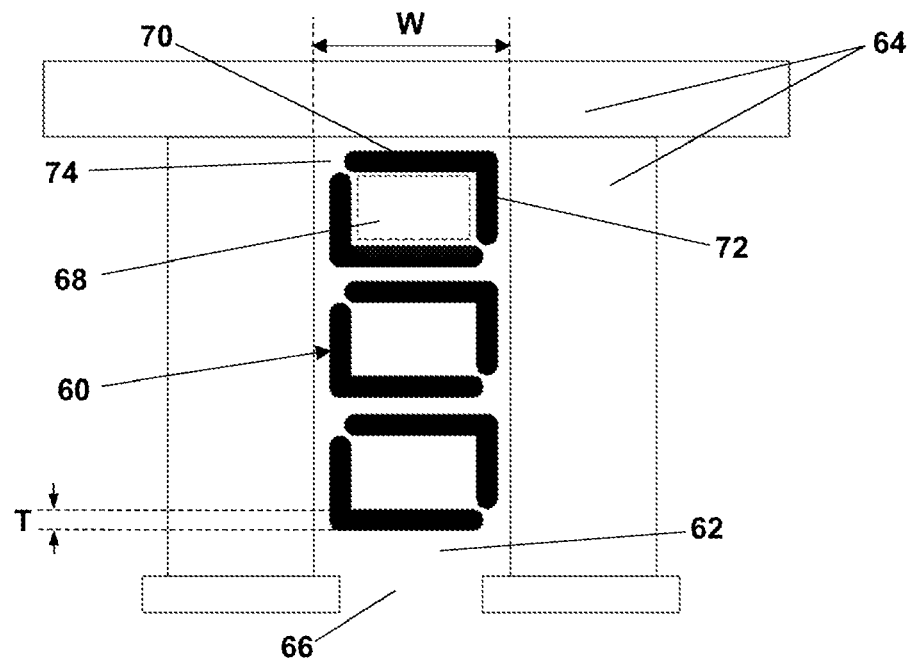
FIG. 6 shows a cross-sectional view of a stator winding comprising an L-shaped conductor, in accordance with an aspect of the disclosure.

With reference to FIG. 6, in accordance with a first aspect of the present disclosure, a winding comprising a conductor 60 having at least one turn forming the winding is disposed within a slot 62 of a stator 64. The slot 62 has a width W.

When the conductor 60 is used in an electrical machine, such as a motor, a cooling fluid, for example oil, is used to fill the slot 62 to cool the conductor 60. The electrical machine may have a dedicated pump system for the cooling fluid, or if the electrical machine is to be used for example in a vehicle which has its own coolant system, the cooling fluid may be pumped by said coolant system. A sleeve (not shown) may cover the opening 66 of the slot 62 to retain the cooling fluid within the slot 62. To this end, the sleeve will extend the width W of the slot 62 to completely cover the opening 66 and provide a fluid tight seal with the stator 64. The sleeve can take any suitable form, and in some examples, may be provided in the form of a membrane or a cover plate.

The conductor 60 is electrically insulated from the cooling fluid and further turns of the conductor 60. To this end, the conductor 60 may be sealed within a suitable coating (not shown). Any suitable coating for electrically insulating the conductor 60 from the cooling fluid and/or further turns of the conductor 60 may be used, for example, an enamel coating.

The conductor 60 is a flat conductor that is formed to have an L-shaped cross-section. The flat nature and L-shaped cross-section of the conductor prevents the formation of a circular conduction path within the cross-section of the conductor for eddy currents to flow. This reduces AC losses therein caused by the skin effect. This is unlike, for instance, the conduction configurations shown in FIGS. 1 and 5, which allow for such circular conduction paths to form therein.

The L-shaped cross-section of the conductor 60 has a long side 70 and a short side 72 joined by a 90 degree angle. In one example, the long side 70 is approximately three times the length of the short side 72. In the depicted embodiment, the long side 70 may extend across the full width W of the slot 62. A gap 74 is left on either side of the conductor 60 between the conductor 60 and the slot 62 to allow cooling fluid to flow.

In the depicted example shown in FIG. 6, one or more pairs of opposing flat, L-shaped conductors 60 are disposed opposite each other within the slot 62 to form a cooling channel 68 for cooling fluid to flow there between. The cooling channel 68 is substantially rectangular in cross-section (as shown in dotted outline). The pairs of opposing L-shaped conductors 60 are arranged such that there is no contact between the pair of conductors 60, to ensure that no circular path is provided for eddy currents to flow. This pairing arrangement improves the current carrying capacity of the conductors 60, whilst improving the cooling available for the conductor 60. This is unlike, for instance, the conduction configurations shown in FIGS. 1, 3 and 4 that do not allow for a substantial cooling channel between conductors.

As many pairs of opposing L-shaped conductors 60 are placed into the slot 62 as space will allow to maximise the slot fill factor and the power carrying capacity/density for the electrical machine. In the depicted example there are three pairs of opposing L-shaped conductors 60 disposed within the slot 62. However, more or fewer pairs may be present depending on the slot shape, size and space available.

It is to be understood that although L-shaped conductors 60 are depicted having a long side 70 and a short side 72 joined by a 90 degree angle; within the scope of this disclosure, the conductors 60 may be only substantially L-shaped (i.e., generally L-shaped) and/or the long side 70 and short side 72 may not be joined at exactly a 90 degree angle, but rather substantially at 90 degrees (e.g., +5 degrees).

Figure 7:
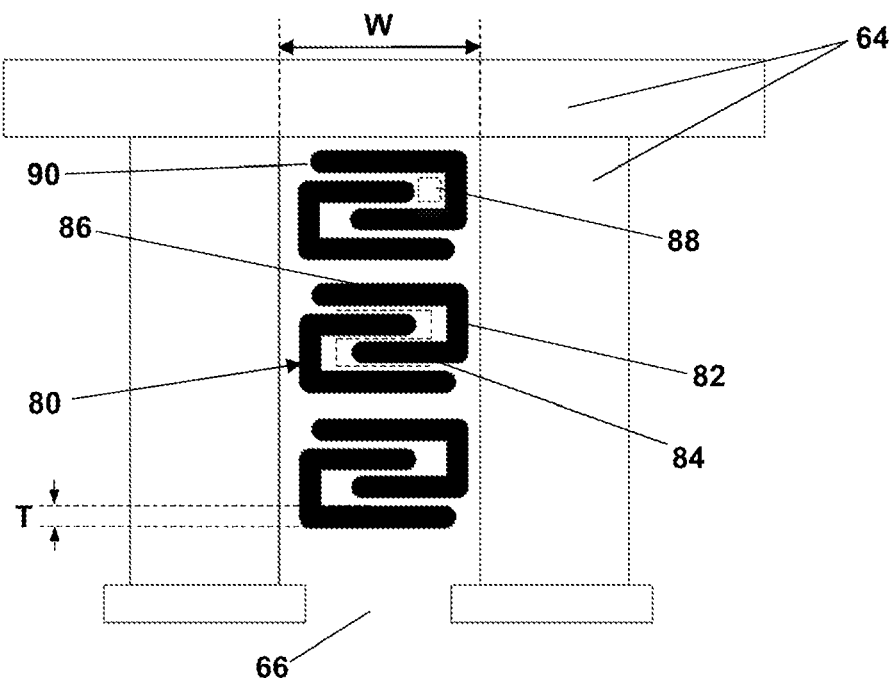
FIG. 7 shows a cross-sectional view of a stator winding comprising a U-shaped conductor, in accordance with another aspect of the disclosure.

With reference to FIG. 7, another winding in accordance with another aspect of the present disclosure is shown. The winding is substantially the same as the previous aspect, but instead comprises a flat conductor 80 having a U-shaped cross section. Much like the L-shaped cross section, the flat nature and U-shaped cross-section prevents the formation of a circular conduction path in the cross-section of the conductor 80 for eddy currents to flow, thereby reducing AC losses caused by the skin effect. It also further improves the slot fill factor and thermal performance of the winding, as discussed more below.

In the depicted example shown in FIG. 7, the U-shaped conductor 80 has a base 82 and two sides 84, 86 each joined to a respective end of the base 82 by a 90 degree angle. One or both of the sides 84, 86 is approximately three times the length of the base 82. The sides 84, 86 may be equal in length; however, in the depicted example, one of the sides 84 is shorter in length than the other side 86. This provides a gap for the base 82 of an adjacent U-shaped conductor 80 when disposed opposite the conductor 80, as explained below. The difference between the lengths of the sides 84, 86 may be approximately equal to the thickness of the base 82. The longer side 86 may extend across substantially the full width W of the slot. In the depicted example, a gap 90 is left between either side of the longer side 86 and the slot 62 to allow cooling fluid to flow.

In a similar manner to the L-shaped conductors 60, in the depicted example shown in FIG. 7, one or more pairs of opposing U-shaped conductors 80 are disposed opposite each other and interleaved together within the slot 62 to increase the slot fill factor. The conductors 80 are interleaved such that one of the sides 84, 86 of each conductor 80 is arranged within the U-shape of the opposite conductor 80 (i.e., one of the sides 84, 86 of one conductor 80 is positioned adjacent the base 82 of the opposite conductor 80).

The pair of opposing U-shaped conductors 80 are arranged such that a cooling channel 88 is formed therebetween. This can further enhance cooling of the conductors 80 during operation. The cooling channel 88 is substantially rectangular in cross-section (as shown in dotted outline). The cooling channel 88 is defined between the base 82 and two sides 84, 86 of one of the pair of opposing U-shaped conductors 80, and an end of the interleaved side 84, 86 of the opposing conductor 80. In the depicted embodiment, the interleaved side is the shorter side 84, therefore the shorter side 84 is arranged within the U-shape of the opposite conductor 80 and the cooling channel 88 is formed between the end of the shorter side 84 of one conductor 80 and the base 82 of the opposite conductor 80. The interleaved side being shorter may allow for the cooling channel 88 to be provided whilst reducing the separation needed between the opposing conductors 80. This can further improve the slot fill factor, without negatively effecting cooling.

As discussed above, there is no contact between the pair of opposing U-shaped conductors 80 to ensure that no circular path is provided for eddy currents to flow. The arrangement of the pair of opposing U-shaped conductors 80 is such that a gap is left between the sides 84, 86 of the opposing conductors 80 to allow cooling fluid to flow there between. Owing to the interleaved U-shaped cross-sections of the conductors 80, the gap and the cooling channel 88 together define a substantially S-shaped cross-sectional area between the pair of opposing U-shaped conductors 80 for fluid to flow (as shown in dotted outline).

As many pairs of opposing interleaved U-shaped conductors 80 are placed into the slot 62 as space will allow to maximise the slot fill factor and the power carrying capacity/density for the electrical machine. In the depicted example there are three pairs of opposing U-shaped conductors 80 disposed with the slot 62. However, more or fewer pairs may be present depending on the slot shape, size and space available.

It is to be appreciated that the flat conductor configuration shown in FIG. 7 results in smaller cooling channels 88 between conductors 80 than the cooling channels 68 between the flat conductors 60 in FIG. 6, but it improves the slot fill factor. Nonetheless, the configurations of the conductors 60, 80 shown in FIGS. 6 and 7 and according to this disclosure permit improved power density and specific power for a winding for an electrical machine. These configurations achieve this by allowing conductor AC losses to be reduced and conductor cooling to be improved.

It is to be understood that although U-shaped conductors 80 are depicted having a base 82 and two sides 84, 86 each joined to a respective end of the base 82 by a 90 degree angle; within the scope of this disclosure, the conductors 80 may be only substantially U-shaped (i.e., generally U-shaped) and/or the two sides 84, 86 may not each be joined to a respective end of the base 82 by exactly a 90 degree angle, but rather at substantially a 90 degree angle (e.g., +5 degrees).

Furthermore, although not depicted, in another embodiment within the scope of this disclosure, the conductors may instead be substantially V-shaped in cross-section. In other words, when comparing to the U-shaped conductors 80, the base 82 is dispensed with and the two sides 84, 86 are joined together at an acute angle to form a general V-shape. Opposing V-shaped conductors could then either be interleaved as with the U-shaped conductors 80 or opposed as in the L-shaped conductors 60 to provide a substantially diamond-shaped cooling channel there between. If V-shaped conductors are interleaved, then one side of the V-shape may be shorter than the other side, in order to define a cooling channel when interleaved within the opposing V-shaped conductor.

In the depicted examples, the slot width W is between 1 cm to 3 cm, and in one example is about 2 cm. Nonetheless, within the scope of this disclosure, the slot 62 can have any suitable width W, and will depend on the size of the electrical machine and application. The conductors 60, 80 may have a substantially uniform thickness T. The thickness T may be between 1 mm to 3 mm, and in one example is about 2 mm. Nonetheless, as will be appreciated, the thickness T can be readily varied according to a particular application e.g., according to the skin depth required for a particular AC frequency.

The conductors 60, 80 may be manufactured by pressing a flat conductor into the desired L- or U-shape. The conductors 60, 80 may alternatively be formed by additive manufacturing, extrusion, or any other suitable method. The conductors 60, 80 may be interconnected through end windings which may be formed by any suitable means, e.g., by hairpin, busbar, or other methods. The conductors 60, 80 may be made of any suitable conductive material. In general, however, the conductors 60, 80 are made of a high conductivity metal, such as copper or aluminium.

Utilising the conductors 60, 80 of the present disclosure in an electrical machine can result in a more compact and lightweight machine for a given power requirement. This means the electrical machine will have a higher power density and/or specific power. Such an electrical machine is suitable for use as an electrical propulsion motor for electric or hybrid vehicles in which power density and specific power are important factors. Such an electrical machine is particularly suitable for use in an aircraft, where these factors are critical due to weight and size concerns. Such aircraft applications may include utilising the electric propulsion motor to drive or provide supplemental power to a propeller or gas turbine engine. In such an application, the electric propulsion motor can be said to be used as part of a hybrid electric powertrain for an aircraft.

The conductors 60, 80 may also be utilised in other types of electrical machines other than electric propulsion motors. For example, they may also be used for windings in a transformer or other suitable electrical machinery where high power carrying capacity windings are required.

Although the figures and the accompanying description describe particular embodiments and examples, it is to be understood that the scope of this disclosure is not to be limited to such specific embodiments, and is, instead, to be determined by the following claims.

The invention claimed is:

1. A winding for an electrical machine, the winding comprising:
   a plurality of pairs of unconnected flat conductors, each pair of unconnected flat conductors having at least one turn to form the winding, the plurality of pairs of flat conductors arranged to have no contact between each of the plurality of pairs of flat conductors;
   wherein each flat conductor comprises a substantially U-shaped cross-section defining a base and two sides each joined to a respective end of the base; and
   wherein one of the sides is shorter than another of the sides.

2. The winding of claim 1, wherein the conductors in each pair of unconnected flat conductors are disposed opposite each other and form a cooling channel therebetween in a cross-sectional view.

3. The winding of claim 2, wherein the conductors in each pair of unconnected flat conductors are interleaved with each other.

4. The winding of claim 3, wherein the two sides are each joined to the respective end of the base by a substantially 90 degree angle.

5. The winding of claim 1, wherein one or both of the sides are approximately three times a length of the base.

6. The winding of claim 1, wherein the conductors in each pair of unconnected flat conductors are interleaved such that a cooling channel is formed between one of the sides of one of the pair of unconnected flat conductors and the base of another of the pair of unconnected flat conductors in a cross-sectional view.

7. The winding of claim 1, wherein the conductors in each pair of unconnected flat conductors are interleaved such that a substantially S-shaped gap separates the pair of unconnected flat conductors in a cross-sectional view.

8. An electrical machine comprising:
   a stator, wherein the stator comprises:
      a slot; and
      the winding of claim 1 disposed within the slot.

9. A winding for an electrical machine, the winding comprising:
   at least one flat conductor having at least one turn to form the winding, wherein the at least one flat conductor comprises a U-shaped cross-section defining a base and two sides each joined to a respective end of the base by a substantially 90 degree angle;
   wherein one of the sides is shorter than another of the sides.

10. The winding of claim 9, wherein one or both of the sides are approximately three times a length of the base.

11. The winding of claim 9, wherein one of the sides is shorter than another of the sides by approximately a thickness of the base.

12. The winding of claim 9, wherein the at least one flat conductor comprises a pair of flat conductors and the flat conductors in the pair of flat conductors are interleaved such that a cooling channel is formed between one of the sides of one of the pair of flat conductors and the base of another of the pair of flat conductors.

13. The winding of claim 9, wherein the at least one flat conductor comprises a pair of flat conductors and the flat conductors in the pair of flat conductors are interleaved such that a substantially S-shaped gap separates the pair of flat conductors.

14. The winding of claim 9, wherein the at least one flat conductor comprises a pair of flat conductors and the flat conductors in the pair of flat conductors are disposed opposite each other and form a cooling channel therebetween in a cross-sectional view.

15. An electrical machine comprising:
   a stator, wherein the stator comprises:
      a slot; and
      the winding of claim 9 disposed within the slot.

16. A winding for an electrical machine, the winding comprising:
   at least one pair of unconnected flat conductors, each pair of unconnected flat conductors having at least one turn to form the winding, wherein each flat conductor of each pair of unconnected flat conductors comprises a U-shaped cross-section defining a base and two sides each joined to a respective end of the base, wherein one of the sides is shorter than another of the sides;

wherein the flat conductors in each pair of unconnected flat conductors are disposed opposite each other and form a cooling channel therebetween in a cross-sectional view.

17. The winding of claim 16, wherein the flat conductors in each pair of unconnected flat conductors are disposed opposite each other to form a substantially rectangular cooling channel therebetween in the cross-sectional view.

18. The winding of claim 16, wherein the flat conductors in each pair of unconnected flat conductors are interleaved such that a substantially S-shaped gap separates the pair of unconnected flat conductors in the cross-sectional view.

19. The winding of claim 16, wherein the flat conductors in each pair of unconnected flat conductors are interleaved with each other.

20. An electrical machine comprising:
   a stator, wherein the stator comprises:
      a slot; and
      the winding of claim 16 disposed within the slot.

* * * * *